Patented Oct. 3, 1933

1,928,840

UNITED STATES PATENT OFFICE 1,928,840

MANUFACTURE OF GLUTAMIC ACID HYDROCHLORIDE, BETAINE ACID SULPHATE, ETC.

Reisuke Masuda, Toledo, Ohio, assignor to The Larrowe-Suzuki Company, Detroit, Mich., a corporation of Ohio No Drawing. Application October 17, 1929
Serial No. 400,444

6 Claims. (Cl. 260—119)

My invention relates to improvements in the recovery of glutamic acid hydrochloride, betaine acid sulphate, acetic acid or an acetate, and residual nitrogen values from desaccharified waste liquors produced in the manufacture of beet sugar. The waste liquors utilized in carrying out my invention are those remaining after the separation of sugar from beet molasses, as by treatment with alkaline earths or by fermentation treatment. The invention includes improvements in processes combining several steps as well as in individual steps which may be combined in these or other processes.

I have discovered that glutamic acid hydrochloride is quite insoluble in aqueous solutions containing both free sulphuric acid and a soluble inorganic chloride and, in my invention, I have applied this discovery to the separation and recovery of glutamic acid as the hydrochloride from the desaccharified waste liquors mentioned. I have also discovered that betaine acid sulphate crystallizes quite readily and, in my invention, I have applied this discovery to the separation and recovery of betaine acid sulphate from these liquors.

In one embodiment, the complete process of my invention comprises, as successive steps, (1) removal of the major part of the potassium and sodium present from the desaccharified waste liquor, (2) digestion of the remaining waste liquor with sulphuric acid at elevated temperature to liberate glutamic acid from its mother substance, (3) concentration of the digested waste liquor, (4) separation of glutamic acid as the hydrochloride from the digested waste liquor, (5) crystallization of betaine acid sulphate from the digested waste liquor, and (6) neutralization of the remaining liquor with lime. The fourth and fifth steps may be carried out in either order; that is, the glutamic acid hydrochloride can be separated first and then the betaine acid sulphate or the betaine acid sulphate can be separated first and then the glutamic acid hydrochloride.

The vapors separated in carrying out the third step include a substantial proportion of acetic acid; this acetic acid, according to my invention, may be recovered by condensation or by neutralization with a base forming an acetate.

According to my invention, glutamic acid hydrochloride is precipitated from the waste liquor digested with sulphuric acid at elevated temperature by treatment with a soluble inorganic chloride such as hydrogen chloride, sodium chloride or magnesium chloride, or a mixture of such chlorides. Hydrogen chloride may be supplied as a gas or in aqueous solution. When an aqueous solution of hydrogen chloride, or of other soluble inorganic chlorides, is used, the digested liquor may be concentrated, by evaporation, prior to separation of glutamic acid hydrochloride. When gaseous hydrogen chloride is used, concentration of the digested liquor may be omitted. Following this treatment the treated liquor is cooled, the glutamic acid hydrochloride is crystallized from the cooled treated liquor and then separated from the residual liquor.

According to my invention, betaine acid sulphate is crystallized from the waste liquor digested with sulphuric acid at elevated temperature by holding this liquor at a sufficiently low temperature, usually in the range of ordinary atmospheric temperatures, for a sufficient period of time, 3 to 5 days for example. The betaine acid sulphate is then separated from the residual liquor.

In one way of carrying out my invention, I concentrate the desaccharified waste liquor, waste liquor from the Steffen's process for example, to a specific gravity of about 1.4 and add sufficient of either sulphuric acid or hydrochloric acid to precipitate as sulphates or chlorides the major part of the potassium and sodium present in the liquor in the form of salts of organic acids. After separation of this precipitate, by filtration for example, I digest the waste liquor at elevated temperature with a sufficient amount of sulphuric acid to liberate the glutamic acid present. I may then concentrate this liquor which has been digested with sulphuric acid at elevated temperature by evaporation. The digested liquor, which may have been concentrated by evaporation, I then treat with one or more soluble inorganic chlorides and, following this treatment, I cool the resulting mixture. Glutamic acid hydrochloride precipitates from this liquor and I separate the precipitated glutamic acid hydrochloride from the residual liquor. A large part of the hydrochloric acid formed may be evaporated from the residual liquor by the application of heat and recovered for reuse. By holding the resulting liquor within the range of ordinary atmospheric temperatures for a sufficient period of time, I then crystallize betaine acid sulphate from the liquor.

Following separation of glutamic acid hydrochloride and betaine acid sulphate, or following separation of the glutamic acid hydrochloride if betaine acid sulphate is not separated, I neutralize the acid constituents of the remaining liquor with lime. The heat developed by the reaction is usually sufficient to drive off most of the remaining water by evaporation, and I thus obtain an almost dry gypsum-like product containing a substantial amount of available nitrogen. This product is useful as a fertilizer.

My invention will be further illustrated by the following examples:

*Example 1.*— To 100 lbs. of concentrated Steffen's waste liquor having a specific gravity of 1.37, 20 lbs. of water and 21 lbs. of 66° Baumé sulphuric acid are added, the mixture is cooled, and the precipitated alkaline sulphates are separated. To the liquor from which the alkaline sulphates have been separated, 31.5 lbs. of 66° Baumé sulphuric acid is added and the mixture is digested at a temperature of 275° F. for 30 minutes. Humus-like substances are usually formed during this digestion; the removal of these substances facilitates further operations. The liquor from the digestion is concentrated by evaporation under subatmospheric pressure to a specific gravity of 1.46. The distillate produced in this evaporation is neutralized with lime giving 8½ lbs. of dry calcium acetate. To the concentrated liquor, 2 lbs. of sodium chloride and 36 lbs. of 20° Baumé hydrochloric acid are added and the mixture is allowed to stand at 40° F. for two days. A crude glutamic acid hydrochloride, about 20 lbs. of glutamic acid hydrochloride about 50% pure, crystallizes during this period. The liquor is separated from the crystallized glutamic acid hydrochloride and is evaporated to two-thirds of its original volume. After standing five days, about 10 lbs. of betaine acid sulphate crystallizes from this liquor. To the liquor remaining after separation of the betaine acid sulphate, 25 lbs. of lime is added and this mixture is then ground and dried to produce about 78 lbs. of a fertilizer product.

*Example 2.*— To 100 lbs. of concentrated Steffen's waste liquor having a specific gravity of 1.37, 20 lbs. of water and 21 lbs. of 66° Baumé sulphuric acid are added, the mixture is cooled, and the precipitated alkaline sulphates are separated. To the liquor from which the alkaline sulphates have been separated, 31.5 lbs. of 66° Baumé sulphuric acid is added and the mixture is digested at a temperature of 275° F. for 30 minutes. Humus-like substances are usually formed during this digestion; the removal of these substances facilitates further operations. The liquor from the digestion is concentrated by evaporation under subatmospheric pressure to a specific gravity of 1.46. After standing five days, about 14 lbs. of betaine acid sulphate crystallizes from this concentrated liquor. To the remaining liquor, 2 lbs. of sodium chloride and 36 lbs of 20° Baumé hydrochloric acid are added and the mixture is allowed to stand at 40° F. for two days. A crude glutamic acid hydrochloride, about 19 lbs. of glutamic acid hydrochloride about 50% pure, crystallizes during this period. The liquor remaining after separation of the glutamic acid hydrochloride is concentrated to about two-thirds of its original volume and treated with lime as in the first example.

By separating the glutamic acid hydrochloride before separating the betaine acid sulphate, a somewhat increased yield of glutamic acid hydrochloride is usually obtained. The reverse is true if the betaine acid sulphate is separated first.

My invention has a number of advantages. Hitherto, the recovery of glutamic acid hydrochloride from such liquors has involved separation of the sulphuric acid from the liquor before precipitation of the glutamic acid hydrochloride. This separation of sulphuric acid, a tedious operation, is eliminated by my invention. Also, the glutamic acid hydrochloride can be precipitated, according to my invention, by a much smaller proportion of the chloride than must be used in the absence of the free sulphuric acid. An improvement in yield may also be obtained by my invention because the solubility of glutamic acid hydrochloride in the mixed solution containing both free sulphuric acid and a soluble inorganic chloride is much smaller than in a solution of the chloride alone of corresponding concentration.

I claim:

1. The process of recovering glutamic acid hydrochloride from desaccharified waste liquors produced in the manufacture of beet sugar, which comprises separating the major part of the potassium and sodium present, digesting the remaining liquor with sulphuric acid at elevated temperature and precipitating glutamic acid hydrochloride from the digested liquor by the addition of a soluble inorganic chloride.

2. The process of recovering betaine acid sulphate from desaccharified waste liquors produced in the manufacture of beet sugar, which comprises separating the major part of the potassium and sodium present, digesting the remaining liquor with sulphuric acid at elevated temperature and crystallizing betaine acid sulphate from the digested liquor.

3. The process of recovering glutamic acid hydrochloride and betaine acid sulphate from desaccharified waste liquors produced in the manufacture of beet sugar, which comprises separating the major part of the potassium and sodium present, digesting the remaining liquor with sulphuric acid at elevated temperature, precipitating glutamic acid hydrochloride from the digested liquor by the addition of a soluble inorganic chloride and thereafter crystallizing betaine acid sulphate from the digested liquor.

4. The process of recovering glutamic acid hydrochloride and betaine acid sulphate from desaccharified waste liquors produced in the manufacture of beet sugar, which comprises separating the major part of the potassium and sodium present, digesting the remaining liquor with sulphuric acid at elevated temperature, crystallizing betaine acid sulphate from the digested liquor and thereafter precipitating glutamic acid hydrochloride from the digested liquor by the addition of a soluble inorganic chloride.

5. In the recovery of glutamic acid hydrochloride from desaccharified waste liquors produced in the manufacture of beet sugar, the improvement which comprises concentrating the digested liquor by evaporation and recovering the acetic acid driven off during the evaporation after digesting the waste liquor with sulphuric acid at elevated temperature.

6. In the recovery of betaine values from desaccharified waste liquors produced in the manufacture of beet sugar, the improvement which comprises digesting the waste liquor with sulfuric acid at elevated temperature and then holding the digested liquor at a low temperature for a sufficient period of time to crystallize betaine acid sulphate from the solution.

REISUKE MASUDA.